US011047057B2

United States Patent
Vörös et al.

(10) Patent No.: US 11,047,057 B2
(45) Date of Patent: Jun. 29, 2021

(54) METHOD FOR MANUFACTURING A THREE-DIMENSIONAL OBJECT AND APPARATUS FOR CONDUCTING SAID METHOD

(71) Applicant: EXADDON AG, Buchberg (CH)

(72) Inventors: Janos Vörös, Zurich (CH); Tomaso Zambelli, Zurich (CH); Luca Hirt, Olten (CH); Stephan Ihle, Zurich (CH)

(73) Assignee: Exaddon AG, Buchberg (CH)

( * ) Notice: Subject to any disclaimer, the term of this patent is extended or adjusted under 35 U.S.C. 154(b) by 307 days.

(21) Appl. No.: 15/761,443

(22) PCT Filed: Sep. 28, 2016

(86) PCT No.: PCT/EP2016/073090
§ 371 (c)(1),
(2) Date: Mar. 20, 2018

(87) PCT Pub. No.: WO2017/055338
PCT Pub. Date: Apr. 6, 2017

(65) Prior Publication Data
US 2019/0048486 A1    Feb. 14, 2019

(30) Foreign Application Priority Data
Sep. 29, 2015   (EP) .................................... 15187361

(51) Int. Cl.
*C25D 1/00*        (2006.01)
*B01L 3/02*        (2006.01)
(Continued)

(52) U.S. Cl.
CPC ............ *C25D 1/003* (2013.01); *B01L 3/0244* (2013.01); *B33Y 10/00* (2014.12); *B33Y 30/00* (2014.12);
(Continued)

(58) Field of Classification Search
None
See application file for complete search history.

(56) References Cited

U.S. PATENT DOCUMENTS 5,641,391 A       6/1997  Hunter et al.
2010/0300886 A1  12/2010  Lin et al.
(Continued)

FOREIGN PATENT DOCUMENTS

CN    102205944    * 10/2011   ............... B82B 3/00
JP    H09-251979 A    9/1997
(Continued)

OTHER PUBLICATIONS

Geerlings et al. "Electrospray deposition from AFM probes with nanoscale apertures", MEMS 2014, San Francisco, CA, Jan. 26-30, 2014. (Year: 2014).*

(Continued)

*Primary Examiner* — Stefanie S Wittenberg
(74) *Attorney, Agent, or Firm* — Morgan, Lewis & Bockius LLP

(57) ABSTRACT

A method for manufacturing a three-dimensional object comprises the steps of (a) bringing at least one nozzle in a first position close to a surface of a substrate, (b) delivering through said at least one nozzle at least one reactant to said surface, (c) effecting a solid forming reaction of said at least one delivered reactant such that said at least one delivered reactant undergoes a transition to become a growing solid deposit on said surface under said at least one nozzle, and (d) detecting an interaction of said growing solid deposit with said at least one nozzle.

13 Claims, 3 Drawing Sheets

(51) Int. Cl.
      *C25D 1/12*           (2006.01)
      *C25D 13/22*      (2006.01)
      *B33Y 10/00*      (2015.01)
      *B33Y 30/00*      (2015.01)
      *B33Y 50/02*      (2015.01)

(52) U.S. Cl.
      CPC ................ *B33Y 50/02* (2014.12); *C25D 1/00* (2013.01); *C25D 1/12* (2013.01); *C25D 13/22* (2013.01); *B01L 2400/0484* (2013.01)

(56) References Cited

U.S. PATENT DOCUMENTS

2013/0142566 A1     6/2013   Yu
2014/0048969 A1*  2/2014   Swanson ............... B29C 64/118
                                                            264/129

FOREIGN PATENT DOCUMENTS

JP         2005-349487 A    12/2005
WO     WO2009011709      *   1/2009     ............... B41J 2/04

OTHER PUBLICATIONS

Nam et al., "Single-step electropolymerization patterning of a polypyrrole nanowire by ultra-short pulses via an AFM cantilever", Nanotechnology, 22, 2011, 225303. (Year: 2011).*
International Search Report dated Nov. 25, 2016, issued in corresponding International Patent Application No. PCT/EP2016/073090.

* cited by examiner

US 11,047,057 B2

METHOD FOR MANUFACTURING A THREE-DIMENSIONAL OBJECT AND APPARATUS FOR CONDUCTING SAID METHOD

BACKGROUND OF THE INVENTION

The present invention relates to the field of additive manufacturing of three-dimensional objects and is particularly suited for fabrication on the micrometer scale. It refers to a method for manufacturing a three-dimensional object according to the preamble of claim 1.

It further refers to an apparatus for conducting said method.

PRIOR ART

There is currently a need for template-free additive manufacturing techniques for various materials due to its many advantages such as independence of masks, rapid prototyping capability and potentially low production cost.

Particularly, three-dimensional fabrication of metallic structures is amongst the most important challenges for these techniques because of the importance of metals for a wide range of technologies, especially in mechanics and electronics applications. On the macro scale a variety of techniques has been developed and is successfully used in the industry, for example Direct Metal Laser Sintering (DMLS) or Electron Beam Melting (EBM).

With the many benefits offered by downscaling of devices, for example in micro- and nanoelectronic and mechanic systems (MEMS/NEMS), there is also a desire for additive manufacturing technologies on the micrometer scale and below. Yet, on such scales, the abovementioned technologies are not applicable due to their inherent limiting factors, such as relying on the local melting of metal powders and the involved high temperatures and limited resolution.

To overcome these issues and to enable the three-dimensional microfabrication of metals by local material addition, several strategies have been proposed to date. For example, Ahn et al. have used micron-sized extruders for colloidal metal inks to obtain free-standing wire-like structures on the micrometer scale (Ahn, B. Y. et al. *Science* 2009, 323, 1590.). However, due to stability requirements for the shear-thinning inks, the resolution is limited and furthermore, post-processing steps such as thermal annealing may be necessary to obtain the desired characteristics for the deposits, e.g. good conductivity.

An alternative method to produce metal shapes relies on the local electrochemical metal deposition from metallic salt solutions, termed local electroplating. Here, several methods have been proposed. The LIGA process was introduced by Bertsch et al. (Bertsch, A. et al. *Proceedings of the IEEE International Conference on Micro Electro Mechanical Systems (MEMS)* 1998, 18.) and is today a well-developed and widespread method for electrochemical metal microfabrication. However, LIGA is not truly an additive manufacturing process since photo masks are required to develop the desired structures layer by layer and several material addition and removal steps are involved. Furthermore, the shape of the fabricated structures is not arbitrary in all dimensions; rather, it is a stacking of sheet-like layers on top of each other. Similar drawbacks exist for methods that use electroplating in three-dimensional polymer masks shaped by stereolithography (e.g. Zeeshan, M. A. et al. *Small* 2014, 10, 1284.).

These drawbacks are tackled by other electrochemical methods based on microelectrodes or micro- and nanopipettes. In this domain, a scanning probe is precisely positioned on a substrate, resulting in the local electrodeposition of metal under the probe. For example, Madden and Hunter employed a microelectrode in a plating bath to obtain micrometer-sized structures by confining the electric field (Madden, J. D., Hunter, I. *J. Microelectromechanical Syst.* 1996, 5, 24.). However, this method requires very sharp electric probes to achieve the field confinement and the fabricated structures are often of porous nature.

In document U.S. Pat. No. 5,641,391 three-dimensional fabrication techniques are disclosed, where either a microelectrode is used as described above, or a micropipette containing an electrolyte and an electrode such that the current flows through the orifice of the micropipette.

Hu and Yu used a similar configuration of micropipettes with specially manufactured tip geometries to achieve the confinement of the deposition reaction via a micrometer-sized electrolyte meniscus between the pipette and the substrate (Hu, J., Yu M.-F., *Science* 2010, 329, 313.). The difference compared to the method proposed by Madden and Hunter is the absence of an electrolyte bath, i.e., sample is in exposed to air at ambient conditions. The advantage of this method is that it produces metal wires of excellent quality in terms of conductivity, mechanical stability and smoothness.

The meniscus-based approach is described for various applications such as wire bonding and the fabrication of nanofibers in different documents, namely US 2011/0073243 A1, U.S. Pat. No. 7,955,486 B2 and US 2013/0142566 A1. However, no particular method to observe the fabrication process was proposed and the movement speed of the pipette is usually determined by calibration procedures prior to the actual fabrication process.

Extensions to use meniscus-confined electrodeposition also for the fabrication of arbitrary three-dimensional objects have been explored recently (Seol, S. K. et al. *Small* 2015, DOI 10.1002/smll.201500177.); however, a demonstration of the successful fabrication of defined and truly arbitrary structures on the micrometer scale is still lacking.

SUMMARY OF THE INVENTION

It is thus an objective of the present invention to provide a new method of additive manufacturing on the micrometer scale, which avoids the drawbacks of known manufacturing methods, allows a concurrent monitoring of the fabrication progress and enables an automated three-dimensional fabrication process.

It is another objective of the invention to provide an apparatus for conducting said method.

These and other objects are obtained by a method according to claim 1 and an apparatus according to claim 12.

The inventive method for manufacturing a three-dimensional object comprises the steps of:
  a) bringing at least one nozzle in a first position close to a surface of a substrate;
  b) delivering through said at least one nozzle at least one reactant to said surface;
  c) effecting a solid forming reaction of said at least one delivered reactant such that said at least one delivered reactant undergoes a transition to become a growing solid deposit) on said surface under said at least one nozzle; and
  d) detecting an interaction of said growing solid deposit with said at least one nozzle.

Especially, said interaction of said growing solid deposit with said at least one nozzle comprises a force exerted on said at least one nozzle.

According to an embodiment of the inventive method the delivery of said at least one reactant is stopped and/or said at least one nozzle is moved from said first position to a second position, when an interaction of said the growing solid deposit with said at least one nozzle is detected.

According to another embodiment of the inventive method said solid forming reaction comprises an electrodeposition.

According to just another embodiment of the inventive method a steady flow of said at least one reactant through said at least one nozzle is achieved by applying an overpressure to a reservoir of said at least one reactant, which reservoir is in fluid connection with said at least one nozzle.

According to another embodiment of the inventive method said at least one reactant comprises a metal salt solution containing metal ions as the base material for deposition of metals, or a precursor solution for the deposition of electrodepositable alloys.

Said deposited metals may comprise Ag, As, Au, Bi, Cd, Co, Cr, Cu, Fe, In, Ir, Mn, Ni, Os, Pb, Pd, Pt, Re, Rh, Ru, Sb, Se, Sn, Tc, Te, Ti, Tl, Zn, and said deposited alloys may comprise brass, bronze, gold alloys, Cd—Ti, Co—W, Zn—Ni, Sn—Ni, Ag—Pb, Ni—Co, Ni—P, Ni—Fe, Ni—Ti, Sn—Pb.

According to another embodiment of the inventive method said at least one reactant comprises a solution containing precursors for the electrodeposition of conducting polymers, especially polypyrrole, polyaniline or poly-3,4-ethylendioxythiophen (PEDOT).

According to just another embodiment of the inventive method during step (b) the flow rate of said at least one reactant is changed in order to change a concentration profile of said at least one reactant close to said at least one nozzle for dynamically changing the size of said solid deposit.

According to a further embodiment of the inventive method a plurality of parallel nozzles is provided, and said plurality of parallel nozzles is used simultaneously to increase fabrication speed and/or to allow parallel fabrication of multiple structures.

According to another embodiment of the inventive method said at least one nozzle comprises a negative geometry that is used to emboss certain features on said solid deposit.

The apparatus according to the invention comprises at least one nozzle and a substrate, whereby said at least one nozzle is fluidly connected to a reservoir containing a reactant, and whereby said at least one nozzle is moveable over a surface of said substrate close to said surface. It is characterized in that said apparatus further comprises first means for effecting a solid forming reaction of said reactant, when said reactant has been delivered by said at least one nozzle, and second means for detecting an interaction of said formed solid with said at least one nozzle.

According to an embodiment of the inventive apparatus said first means comprises said surface being electrically conductive, an electrolyte bath, which covers said surface of said substrate and fills the space around said at least one nozzle, and a potentiostat with a working electrode, a reference electrode and/or a counter electrode, whereby said working electrode is electrically connected to said surface, and said reference electrode and/or counter electrode are immersed in said electrolyte bath between said at least one nozzle and said surface.

According to another embodiment of the inventive apparatus said second means comprises an atomic force microscope with a hollow cantilever having a tip, which tip provides said at least one nozzle, and with detecting means for detecting a deflection of said cantilever.

According to just another embodiment of the inventive apparatus a pressure controller is connected to said reservoir, and said pressure controller and said first and second means are connected to a main controller.

BRIEF DESCRIPTION OF THE DRAWINGS

The present invention is now to be explained more closely by means of different embodiments and with reference to the attached drawings.

DETAILED DESCRIPTION OF DIFFERENT EMBODIMENTS OF THE INVENTION

Figure 1:
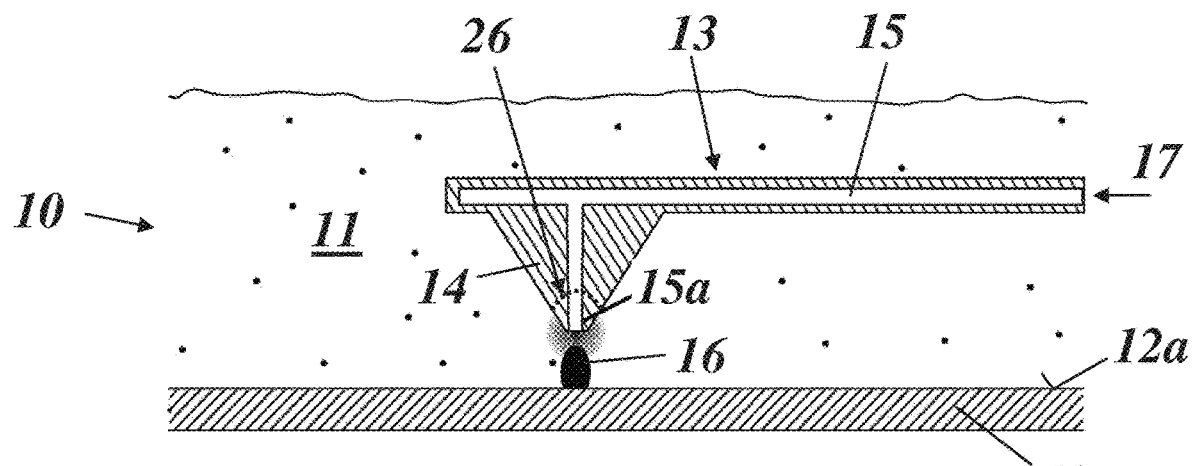
FIG. 1 illustrates in a simplified diagram the concept according to an embodiment of the invention, wherein a nozzle, especially a hollow cantilever, is used to deliver a reactant locally to a substrate, which is covered by a solution, leading to a localized reaction forming a solid deposit.

In general, the objective of an automated additive manufacturing of structures on the micrometer scale in accordance with the present invention is achieved in a manufacturing apparatus 10 as follows (see FIG. 1): A nozzle 15a, which may be part of a tip 14 of a hollow cantilever 13 and is supplied with a fluid reactant 17 through a channel 15 in said cantilever, is brought close to a surface 12a of a substrate 12. The nozzle 15a is used to deliver at least one reactant 17 to the surface 12a, where a reaction takes place such that the delivered reactant undergoes a transition to become a solid deposit 16 on said surface 12a just under the nozzle 15a.

Eventually, the growing solid deposit 16 will interact with the nozzle 15a or tip 14, which features a detection method to immediately register this interaction event. This information (about the actual height of the solid deposit) may then be used to automate the deposition process, i.e. the nozzle 15a may be moved to a new location immediately after the interaction has been detected. The solid forming reaction now takes place at the new nozzle location, generally at the same height as the previous position. Eventually, when all desired locations on the current height have been filled with the solid material to be deposited, the next position may be approached on a higher level. In this way, a desired or predetermined three-dimensional shape may be fabricated by the defined movement of the nozzle 15a.

If the nozzle (15a in FIG. 1) is provided with a negative geometry 26 (dotted line in FIG. 1) the growing solid deposit may eventually fill this negative geometry 26, so that the resulting structure may be embossed by said negative geometry 26

Figure 3:
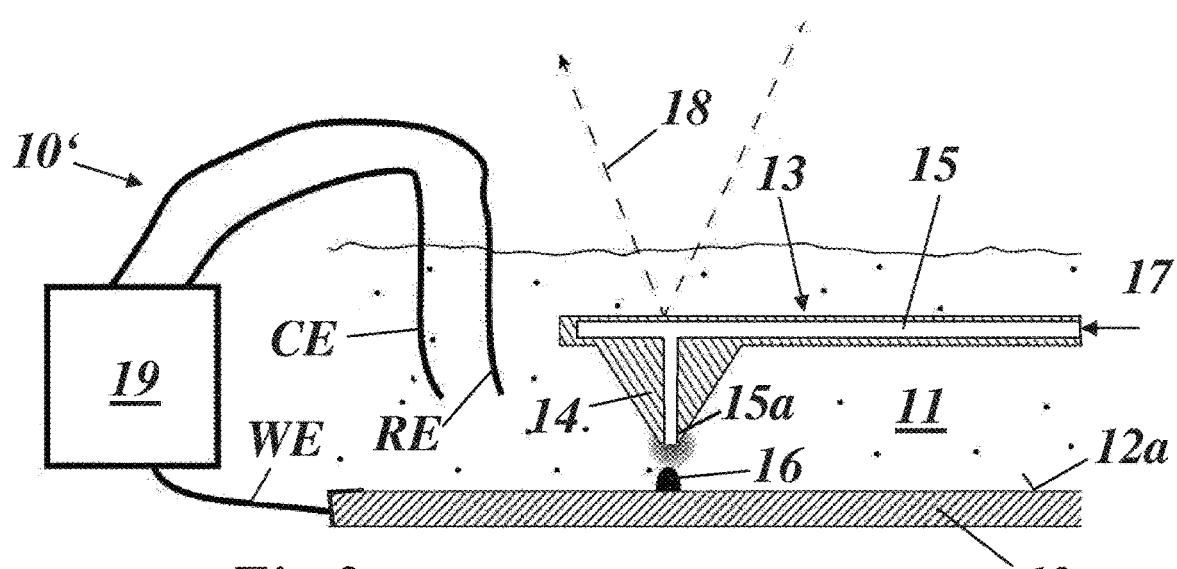
FIG. 3 shows the electrochemical setup for the concept according to FIG. 1, whereby the cantilever is mounted on an Atomic Force Microscope (AFM)
Figure 4:
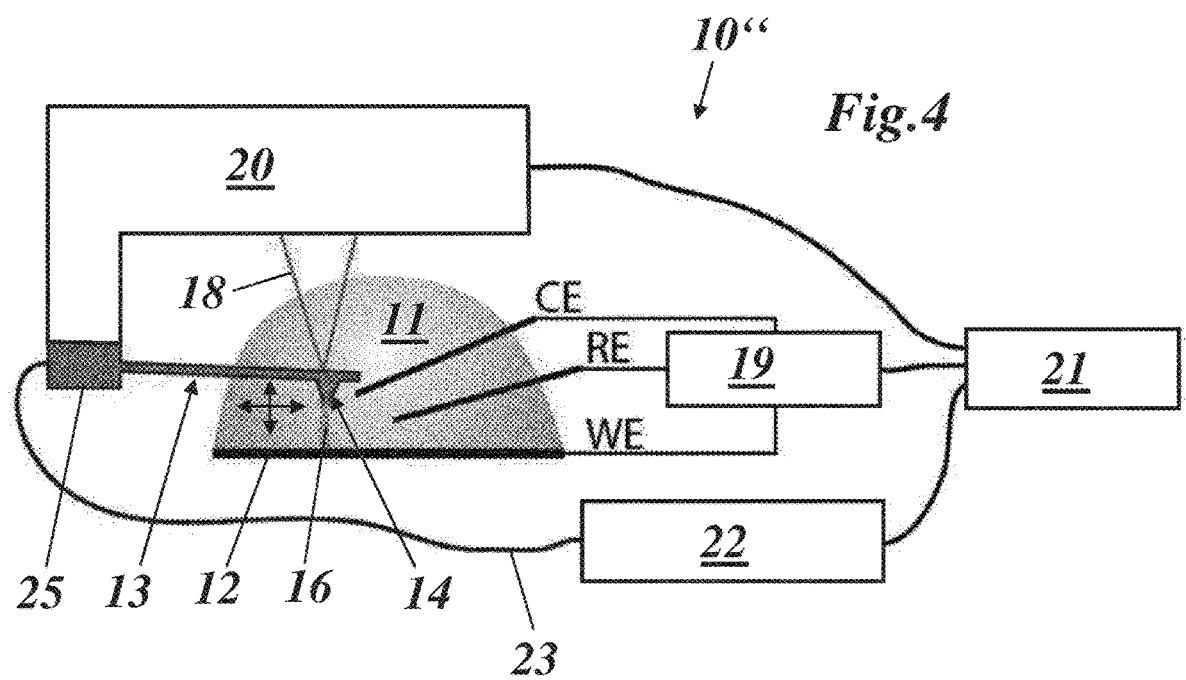
FIG. 4 shows the complete electrochemical and control setup using an AFM for the concept according to FIG. 1.

In one embodiment of the invention, the reactant may comprise dissolved metal ions and the solid forming reaction may be electroplating. To achieve the electroplating, the nozzle 15a and the substrate 12 are placed in an electrolyte bath 11 (FIGS. 1, 3 and 4). The nozzle 15a is used to provide metal ions locally by applying a flow of metal salt solution from the nozzle 15a. The nozzle 15a is brought close to an electrically conductive surface 12a of a substrate 12. A non-conductive substrate 12 may be coated with a conductive surface layer 12a, or the substrate 12 itself may be conductive.

A potential is applied to said conductive substrate 12 or surface 12a by means of a voltage source (potentiostat 19, working electrode WE) and at least one additional electrode (reference electrode RE and/or counter electrode CE) in the electrolyte bath 11 such that the metal ions undergo a reduction reaction on the substrate 12, leading to a local solid metal deposit 16. The growth of said deposit 16 may be detected as soon as the deposit interacts with the nozzle 15a or tip 14 such that the next desired position of metal deposition may be approached. The interaction between solid deposit 16 and tip 14 causes a deflection of cantilever 13, which may be detected by a reflected laser beam 18 (FIG. 3), which mechanism is for example part of an atomic force microscope (AFM).

EXAMPLES

In one embodiment (apparatus 10') of the invention (FIG. 3), a copper sulfate electroplating solution (1M $CuSO_4$ in 0.8M $H_2SO_4$) may be delivered by the nozzle 15a, providing metal ions as the reactants. The nozzle 15a is placed in an electrolyte bath 11 ($H_2SO_4$ at $pH_3$). A conductive substrate 12 is used and polarized at a sufficiently cathodic potential by at least one additional electrode CE, RE, which is placed in the electrolyte bath 11, such that the metal ions provided by the nozzle 15a are reduced locally, resulting in a solid metal deposit 16 growing under the nozzle 15a.

For example, a silver wire may be employed as the reference electrode RE and a platinum wire may be employed as a counter electrode CE, while a gold film serves as the working electrode WE. The substrate 12 is polarized at a potential of −0.6V versus the used silver wire reference electrode RE with the use of potentiostat 19.

Figure 2:
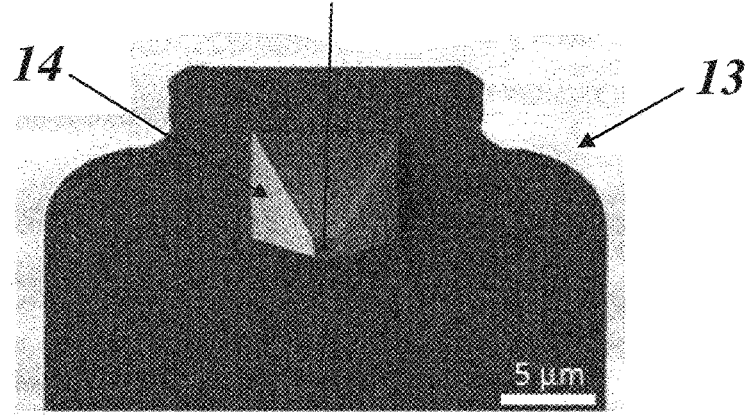
FIG. 2 is a view from below on an exemplary cantilever with a tip and a nozzle provided therein.

In one embodiment, "FluidFM" probes (Meister, A. et al. Nano Lett. 2009, 9, 2501; WO 2010/012423 A1; available from Cytosurge, Switzerland) with a 300 nm square aperture may be used as the nozzle 15a (FIG. 2) and the capability to measure the deflection of the probes via a reflected laser beam 18 may be used to detect touching events between the growing metal deposit 16 and the probe (cantilever 13) for automated fabrication of a three-dimensional metal structure.

In the apparatus 10" shown in FIG. 4 a hollow cantilever 13 with its tip 14 is x,y,z-positioned and its deflection is monitored by an AFM head of an atomic force microscope (AFM) 20 using the standard optical beam deflection method (laser beam 18). A pressure controller 22 connected to a reactant reservoir 25 by means of a pressure supply line 23 is used to set the flow of metal ions from the probe aperture (nozzle 15a) and a potentiostat 19 is used to polarize the substrate 12 such that the metal ions are reduced locally under the probe. The system components 19, 20 and 22 are synchronized and controlled by a main controller 21, which may be a PC, or the like. In this way 3D printing may be automated by a dedicated software program.

Figure 9:
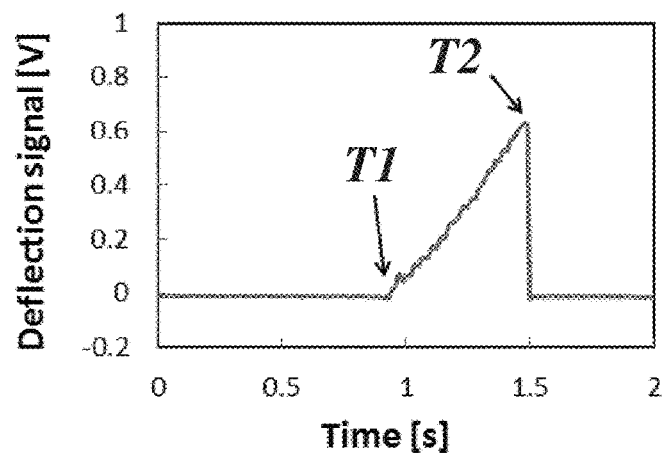
FIG. 9 shows a typical deflection signal for a solid deposit touching a "FluidFM" cantilever of an AFM.

FIG. 9 shows the cantilever deflection signal of an AFM for a sample interaction event (touching event), where the growing deposit leads to an upward deflection of the cantilever upon contact at time $T_1=1$ S. At time $T_2=1.5$ S, the cantilever is moved to the next printing position and thus the cantilever deflection signal goes back to the initial state.

Figure 5:
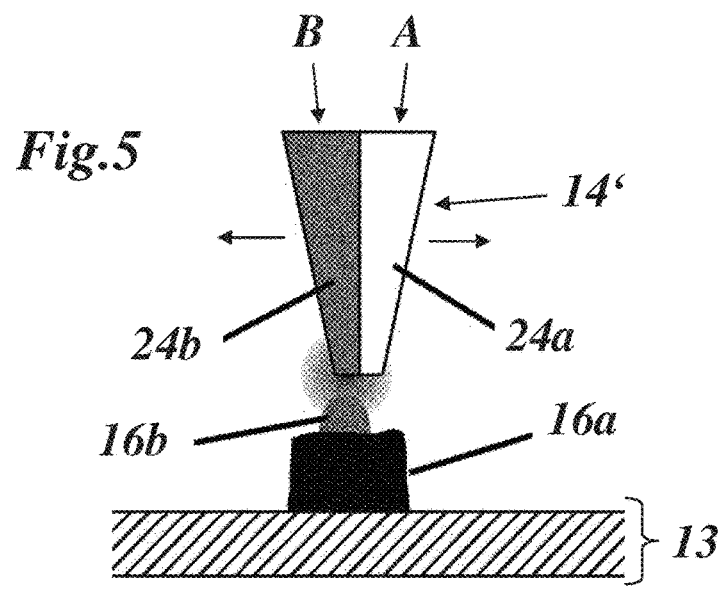
FIG. 5 shows particulars of a concept of multiple supply channels for the on-demand delivery of multiple reactants according to another embodiment of the invention, allowing for the creation of hybrid material structures, whereby two channels are provided for supplying two different solutions, with one channel currently supplying reactants to create a structure of material B on top of a structure of material A.

FIG. 5 illustrates the concept of multiple supply channels or nozzles 24a, 24b for the on-demand delivery of multiple reactants, allowing for the creation of hybrid material structures. In this example, two channels 24a and 24b in a tip 14' containing (supplying) two different solutions or reactants A and B are depicted, with channel 24b currently supplying reactants to create a structure of material B (solid deposit 16b) on top of a structure of material A (solid deposit 16a).

Figure 6:
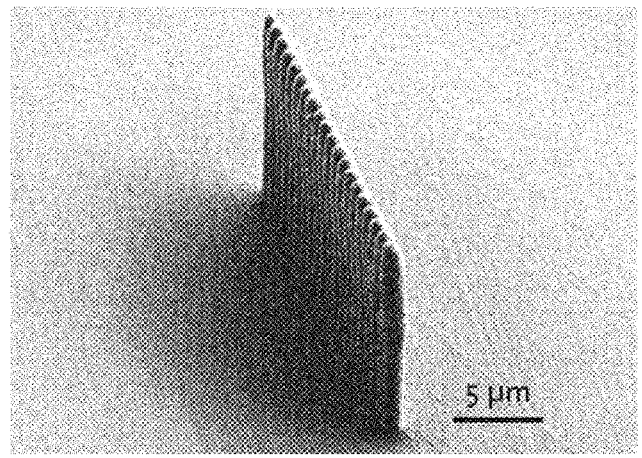
FIG. 6 shows an exemplary sample structure fabricated according to an embodiment of the present invention, wherein a wall of 1 µm thickness, 2 µm length and 15 µm height was fabricated with an apparatus according to FIG. 4.

FIG. 6 shows a Scanning Electron Microscopy (SEM) image of a sample structure fabricated using apparatus 10" of FIG. 4. A wall of 1 μm thickness, 20 μm length and 15 μm height was fabricated by moving a "FluidFM" probe featuring a 600 nm square aperture along the wall length in 1 μm steps each time a touching event was registered. After 20 steps, the probe was lifted by 0.25 μm and the deposition process was repeated for all 20 positions on the new height level. This process was continued until the wall reached the desired final height of 15 μm, whereupon the flow of reactants was interrupted and the fabrication process was completed. The material of the wall was Cu and solutions of $CuSO_4$ 1.08M in $H_2SO_4$ 0.8M in the cantilever of the "FluidFM" probe, and $H_2SO_4$ $pH_3$ in the surrounding droplet (electrolyte bath) were used.

Figure 7:
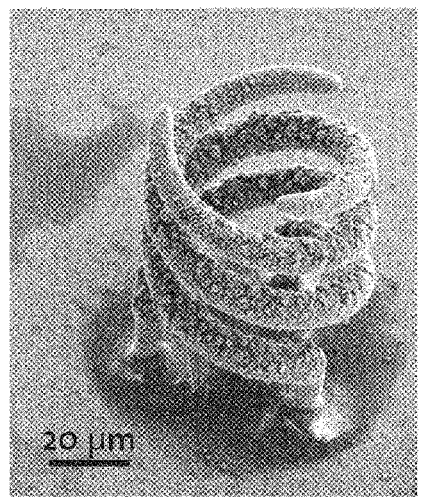
FIG. 7 shows three intertwined helical structures that may be fabricated with a process according to an embodiment of the invention, whereby the intertwined arrangement of the helices is enabled by a layer-by-layer strategy of this approach, i.e. the helices are produced in parallel rather than one by one.

FIG. 7 shows three intertwined helical structures (of copper) that may be fabricated with a process according to the present invention. The intertwined arrangement of the helices is enabled by the layer-by-layer strategy of this approach; i.e. the helices were produced in parallel rather than one by one.

In another embodiment of the inventive method, the delivery of the reactant through the nozzle may be controlled dynamically by varying the flow rate of reactant, for example by employing a pump. This enables a varying speed of the deposition reaction and a varying size of the created deposits such that these parameters can be set according to the demands of the structure to be fabricated.

Figure 8:
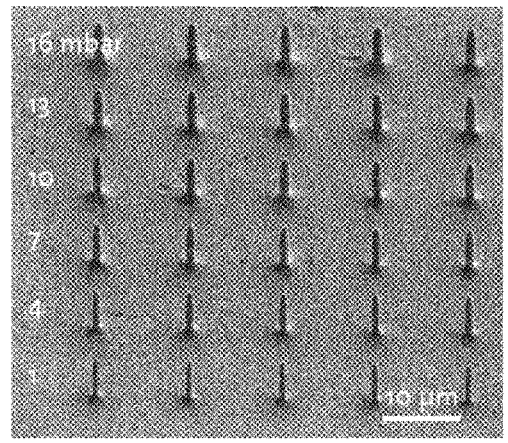
FIG. 8 shows a sample structure generated for various flow rates that were set by varying pump pressures; it is apparent that the generated pillar structures vary in size for different applied flow rates.

FIG. 8 shows a sample structure with various copper pillars generated for various flow rates that were set by varying pump pressures. It is apparent that the generated pillar structures vary in size for different applied flow rates.

In summary, the present invention comprises the following characteristic features and variants:

The method is a procedure to fabricate three-dimensional structures of arbitrary geometries using delivery of a reactant to a location where a solid forming reaction can take place such that the growth of the structure can be detected by the system.

The solid forming reaction may be electrodeposition.

One or several base reactants from which the structure is fabricated are provided through an aperture that is brought close to a surface.

The reactant may be a metal salt solution containing metal ions as the base material for deposition of metals (Ag, As, Au, Bi, Cd, Co, Cr, Cu, Fe, In, Ir, Mn, Ni, Os, Pb, Pd, Pt, Re, Rh, Ru, Sb, Se, Sn, Tc, Te, Ti, Tl, Zn); or a precursor solution for the deposition of alloys including brass, bronze, electrodepositable gold alloys, Cd—Ti, Co—W, Zn—Ni, Sn—Ni, Ag—Pb, Ni—Co, Ni—P, Ni—Fe, Ni—Ti, Sn—Pb and other electrodepositable alloys; or a solution containing precursors for the electrodeposition of conducting polymers (polypyrrole, polyaniline, PEDOT, etc.)

Within the method a steady flow of reactants through the aperture is achieved by applying an overpressure to the reservoir of reactants.

A surface may be provided and polarized in such a way that the provided base reactant becomes a solid deposit on the surface in an electrochemical reaction.

The growth of the structure may be detected by touching events between the structure and the aperture such that the process may be automated e.g. by using "FluidFM" cantilevers by observing the deflection signal Alternatively, the change in the mechanical resonance frequency of "FluidFM" cantilevers may be observed; or the change in the oscillation amplitude at a given frequency of "FluidFM" cantilevers may be observed; or the change in the mechanical resonance of glass micropipettes that are excited by a dither piezo-element may be observed; the frequency shift of a quartz resonator attached to a glass pipette may be observed; or the change in ion conductance through the aperture may be observed.

The position of the aperture may be shifted after each growth detection event such that the desired structure is fabricated in a layer-by-layer (or voxel-by voxel) fashion.

The reactant flow may be changed to change the concentration profile of reactants close to the aperture for dynamically changing the size of deposited features.

The edge of the aperture may contain the negative geometry of desired structures that can be employed to emboss features (stamp probes).

The solid may be a metal, polymer, hydrogel, glass, ceramics, or mineral.

LIST OF REFERENCE NUMERALS 10,10' manufacturing apparatus
10" manufacturing apparatus
11 electrolyte bath
12 substrate
12a surface (substrate)
13 cantilever
14,14' tip
15 channel
15a nozzle
16 solid deposit
16a,b solid deposit
17 reactant
18 laser beam
19 potentiostat
20 atomic force microscope (AFM)
21 main controller (e.g. PC)
22 pressure controller
23 pressure supply line
24a,b nozzle (supply channel)
25 reservoir (reactant)
26 negative geometry
A,B reactant
CE counter electrode
RE reference electrode
$T_1$, $T_2$ point of time
WE working electrode

The invention claimed is:

1. An electrodeposition method for manufacturing a three-dimensional object, comprising the steps of:
   a. providing an apparatus comprising at least one nozzle, a substrate having a surface, an electrolyte bath covering the surface, a potentiostat including a working electrode, a reference electrode and/or a counter electrode, and a hollow cantilever including the at least one nozzle, wherein the working electrode is electrically connected to the surface, the reference electrode and/or counter electrode are immersed in the electrolyte bath and positioned between the at least one nozzle and the surface, the at least one nozzle fluidly connected to a reservoir containing at least one reactant, and the at least one nozzle is immersed in the electrolyte bath and moveable over the surface of the substrate;
   b. bringing said at least one nozzle in a first position close to said surface of said substrate;
   c. delivering through said at least one nozzle said at least one reactant to said surface;
   d. after the step of delivering, electrodepositing a solid deposit using said at least one delivered reactant on said surface under said at least one nozzle; and
   e. detecting an interaction of said growing solid deposit with said at least one nozzle.

2. Method as claimed in claim 1, wherein the delivery of said at least one reactant is stopped and/or said at least one nozzle is moved from said first position to a second position, when said interaction of said growing solid deposit with said at least one nozzle is detected.

3. Method as claimed in claim 1, wherein a steady flow of said at least one reactant through said at least one nozzle is achieved by applying an overpressure to said reservoir.

4. Method as claimed in claim 1, wherein said at least one reactant comprises a metal salt solution containing metal ions as the base material for deposition of metals, or a precursor solution for the deposition of electrodepositable alloys.

5. Method as claimed in claim 4, wherein said deposited metals comprise Ag, As, Au, Bi, Cd, Co, Cr, Cu, Fe, In, Ir, Mn, Ni, Os, Pb, Pd, Pt, Re, Rh, Ru, Sb, Se, Sn, Tc, Te, Ti, Tl, Zn, and that said deposited alloys comprise brass, bronze, gold alloys, Cd—Ti, Co—W, Zn—Ni, Sn—Ni, Ag—Pb, Ni—Co, Ni—P, Ni—Fe, Ni—Ti, Sn—Pb.

6. Method as claimed in claim 1, wherein said at least one reactant comprises a solution containing precursors for the electrodeposition of conducting polymers.

7. Method as claimed in claim 1, wherein during step the flow rate of said at least one reactant is changed in order to change a concentration profile of said at least one reactant close to said at least one nozzle for dynamically changing the size of said solid deposit.

8. Method as claimed in claim 1, wherein a plurality of parallel nozzles is provided, and wherein said plurality of parallel nozzles is used simultaneously to increase fabrication speed and/or to allow parallel fabrication of multiple structures.

9. Method as claimed in claim 1, wherein said at least one nozzle comprises a negative geometry that is used to emboss certain features on said solid deposit.

10. Method as claimed in claim 1, wherein said interaction of said growing solid deposit with said at least one nozzle comprises a force exerted on said at least one nozzle.

11. Method as claimed in claim 6, wherein said conducting polymers include polypyrrole.

12. Method as claimed in claim 1, wherein said at least one delivered reactant is supplied through a channel in said cantilever.

13. An electrodeposition method for manufacturing a three-dimensional object, comprising the steps of:

a. within an electrolyte bath, bringing at least one nozzle in a first position close to a surface of a substrate;

b. delivering through the at least one nozzle at least one reactant to the surface;

c. after the step of delivering, electrodepositing a solid deposit using the at least one delivered reactant on the surface under the at least one nozzle; and d. detecting an interaction of the growing solid deposit with the at least one nozzle, wherein the electrodepositing is effected by a potential applied to the surface by a working electrode and at least one additional electrode that is immersed in the electrolyte bath, wherein the at least one nozzle is provided within a tip of a hollow cantilever, and wherein the at least one additional electrode is a counter electrode that is positioned between the at least one nozzle and the surface.

* * * * *